C. F. JOHNSTON AND G. G. REES.
COMBINED WASHER AND LOCK NUT.
APPLICATION FILED JAN. 26, 1920.

1,384,019. Patented July 5, 1921.

INVENTOR
Charles F. Johnston
and
BY George G. Rees
Miller & Henry
ATTORNEYS

UNITED STATES PATENT OFFICE.

CHARLES F. JOHNSTON AND GEORGE G. REES, OF SAN FRANCISCO, CALIFORNIA.

COMBINED WASHER AND LOCK-NUT.

1,384,019.  Specification of Letters Patent.  Patented July 5, 1921.

Application filed January 26, 1920. Serial No. 354,005.

*To all whom it may concern:*

Be it known that we, CHARLES F. JOHNSTON, a citizen of the United States, and GEORGE G. REES, a subject of Great Britain, and both residents of the city and county of San Francisco, State of California, have invented new and useful Improvements in Combined Washers and Lock-Nuts, of which the following is a specification.

Our invention has for its object the provision of a faced washer and a nut coöperating therewith, and the latter tapped for assembly with a screw thread and adapted to clamp against a surface with which they are assembled and against which the washer bears, and also to clamp against the said screw thread.

Other objects will appear from the drawings and description which follow. By referring to the accompanying drawings our invention will be made clear.

Throughout the figures similar numerals refer to identical parts.

Figure 1:
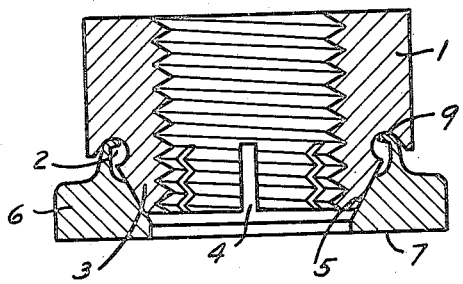
Figure 1 is a cross section through a preferred form of the nut and washer of our invention.
Figure 2:
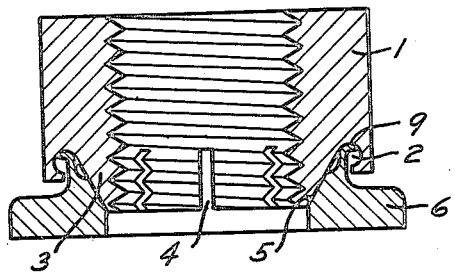
Fig. 2 is a cross section through a nut and washer embodying our invention which varies somewhat from the structure shown in Fig. 1.
Figure 3:
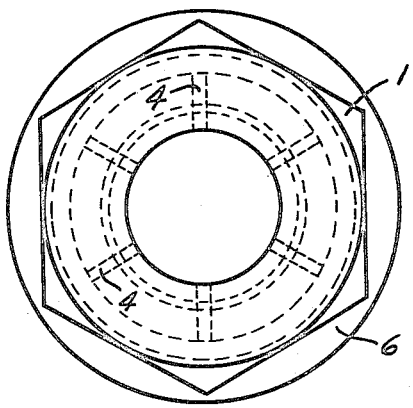
Fig. 3 is a plan of Fig. 1.
Figure 4:
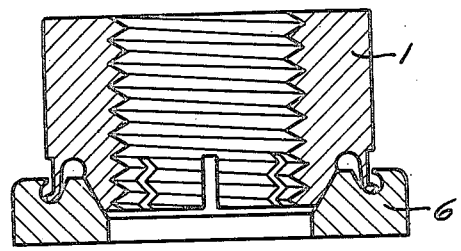
Fig. 4 is a variation in the locking flange and nut assembly but within our invention, shown in section.
Figure 5:
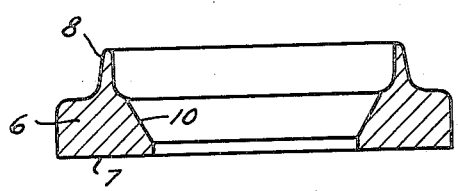
Fig. 5 is a section detail through the washer of Fig. 1 before initial assembly with the nut.

Numeral 1 is a nut preferably of the well known hexagon form, having a recess 2 cut from its under face. The body of the nut portion projects as shown at 3 and has cut through the side thereof slots, one of which is indicated at 4. The outer surface of the projecting portion 3 is tapered as indicated at 5. At 6 is indicated a washer preferably of circular form, having a face 7 for bearing against any assembled structure. This washer is provided with a collar portion 8 as shown in Fig. 5 against which the nut 1 may be initially clamped, so that the said collar 8 is compressed by the recess 2 into the form shown at 9 (Fig. 1) thus forming a retaining means by which the washer 6 is loosely retained with the nut 1, but may be freely rotated about the surfaces 5 and 10. It will be seen that the washer and nut are held together by the collar flange of the one projecting into the recess of the other, the flange being forced to engage the recess beyond the projecting ledge thereof. Referring specifically to Fig. 2, this is formed on the washer and is forced outward by the taper surface 3 of the collar nut at 9 and beyond the ledge of the recess 2, and in Fig. 4 the collar is formed on the nut 1 and is turned outward by the recess formed in the washer 6 thereupon engaging under the ledge formed by said recess.

Figure 6:
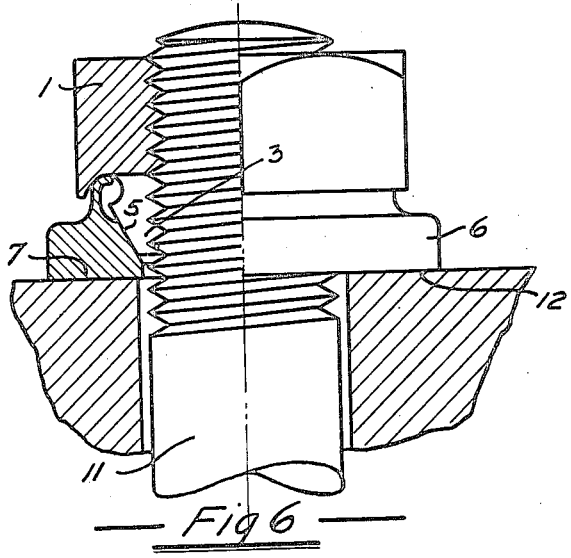
Fig. 6 is a part section and part side view of our invention as shown in Fig. 1 and assembled with a bolt and structure 12.

The operation of our invention is as follows:

The washer 6 may be first placed over the bolt 11 and the nut 1 thereof initially assembled therewith by screwing it down on said washer, the first action being the crimping or pressing over of the flange 9 within the recess 2, or The nut 1 and washer 6 may be initially assembled with the collar 9 compressed in the recess 2. The nut 1 may be now clamped on the bolt 11, forcing the washer 6 against the surface 12, (see Fig. 6) at which time the inclined member 3 will be forced downward against the sloping surface 5 of the washer 6, compressing the portion 3, which latter is caused to grip the threads of the bolt 11 by the freedom allowed in the slots as 4. The said compression will tightly bind or lock the screw threads of the nut 1 against the screw threads of the bolt 11, thereby effectively locking the nut in place on the threads and against the washer. It is to be noted that the nut 1 turns freely with respect to the washer 6, and therefore no injury is done to the surface 12, even though it be of much softer metal, as aluminum, which is frequently used in practice in combination with the steel washer and nut.

To disengage the nut, it is only necessary to rotate the nut 1 in the opposite direction, when the portion 3 will be released from the pressure heretofore due to the inclined surface 5 and will spring outward and free the threads. It is to be noted that the washer 6 does not rotate at such time, and that therefore the surface 12 is retained intact for later reassembly with the said washer and nut, neither are the threads damaged in any way but present a full bearing and a maximum resistance to shear.

Attention is directed to the recess 2 being formed larger than the collar 8 when the latter is assembled therein, so as to permit relative displacement in an axial direction between the nut 1 and the washer 6 to a sufficient degree to permit a compression or a release between the surface 5 and the inclined surface of the portion 3.

We claim:

A locking nut and washer comprising a polygonal periphery on the said nut and a conical projecting flange split parallel with the axis, the nut threaded axially and recessed between said conical surface and said polygonal surface, and provided with an overhanging edge bounding said recess; in combination with a washer having a conical recess adapted to compress the conical surface of the said nut and a flange to engage the recess in the nut and compress over said edge when the nut and washer are pressed together.

In testimony whereof, we have hereunto set our hands at the city of San Francisco, State of California, this 20th day of January, 1920.

CHARLES F. JOHNSTON.
GEORGE G. REES.